United States Patent
Lee

(10) Patent No.: US 11,188,155 B2
(45) Date of Patent: Nov. 30, 2021

(54) METHOD AND APPARATUS FOR INPUTTING CHARACTER BASED ON MOTION RECOGNITION OF BODY

(71) Applicant: Jin Woo Lee, Seoul (KR)

(72) Inventor: Jin Woo Lee, Seoul (KR)

(*) Notice: Subject to any disclaimer, the term of this patent is extended or adjusted under 35 U.S.C. 154(b) by 0 days.

(21) Appl. No.: 16/880,165

(22) Filed: May 21, 2020

(65) Prior Publication Data

US 2020/0371599 A1    Nov. 26, 2020

(30) Foreign Application Priority Data

May 21, 2019 (KR) .................. 10-2019-0059174

(51) Int. Cl.
*G06F 3/01* (2006.01)
*G06F 3/0488* (2013.01)

(52) U.S. Cl.
CPC ............ *G06F 3/017* (2013.01); *G06F 3/0488* (2013.01)

(58) Field of Classification Search
CPC ....... G06F 3/017; G06F 3/0488; G06F 3/0233
See application file for complete search history.

(56) References Cited

U.S. PATENT DOCUMENTS

| | | | | |
|---|---|---|---|---|
| 5,767,842 A * | 6/1998 | Korth | ....................... | G06F 3/011 345/168 |
| 6,512,838 B1 * | 1/2003 | Rafii | ........................ | G01S 17/89 382/106 |
| 6,611,253 B1 * | 8/2003 | Cohen | ................... | G06F 3/0418 345/168 |
| 6,614,422 B1 * | 9/2003 | Rafii | ...................... | G06F 1/1626 345/156 |
| 8,537,036 B2 * | 9/2013 | Brusell | ..................... | A61F 4/00 341/21 |
| 9,720,513 B2 * | 8/2017 | Ahn | ....................... | G06F 3/0304 |
| 10,275,098 B1 * | 4/2019 | Clements | ................ | G06F 3/011 |
| 2003/0132950 A1 * | 7/2003 | Surucu | ................... | G06F 1/1626 715/700 |
| 2003/0197687 A1 * | 10/2003 | Shetter | ................ | G06F 3/04886 345/173 |
| 2004/0032398 A1 * | 2/2004 | Ariel | ...................... | G06F 3/0426 345/168 |
| 2010/0177035 A1 * | 7/2010 | Schowengerdt | ........ | G06F 3/011 345/156 |

(Continued)

FOREIGN PATENT DOCUMENTS

| KR | 10-2011-0059498 A | 6/2011 | |
|---|---|---|---|
| KR | 10-1962464 B1 | 7/2019 | |
| WO | WO-02075515 A1 * | 9/2002 | .............. G06F 3/011 |

*Primary Examiner* — David D Davis
(74) *Attorney, Agent, or Firm* — Maier & Maier, PLLC

(57) ABSTRACT

A motion-based character input method and apparatus are provided. The method includes following steps: matching each of a plurality of representative objects with one of bodies, where the plurality of representative objects are respectively included in object groups each of which includes one or more objects; when a first motion of a first body part matched with a representative object among the plurality of representative objects is detected, recognizing the representative object as a first input; and when a second motion of a second body part matched with an object in an object group including the representative object is detected after the detection of the first motion, recognizing the object as a second input.

13 Claims, 7 Drawing Sheets

(56) References Cited

U.S. PATENT DOCUMENTS

| | | | |
|---|---|---|---|
| 2013/0300650 A1* | 11/2013 | Liu | G06F 3/011 345/156 |
| 2014/0043232 A1* | 2/2014 | Kurokawa | G06F 3/0304 345/156 |
| 2016/0209928 A1* | 7/2016 | Kandur Raja | G06F 3/04886 |
| 2016/0274667 A1* | 9/2016 | Ahn | G06F 3/017 |
| 2018/0120766 A1* | 5/2018 | Kline | G03H 1/2249 |
| 2018/0260033 A1* | 9/2018 | Norieda | G06F 3/014 |

* cited by examiner t

METHOD AND APPARATUS FOR INPUTTING CHARACTER BASED ON MOTION RECOGNITION OF BODY

FIELD

The present disclosure relates to a method and an apparatus for inputting characters; and, more particularly to, a method and an apparatus for inputting characters based on motion recognition by matching a representative object with motion of a part of a body (e.g., a finger, an eye, a tongue, or the like) and matching an object group including one or more objects with each representative object.

BACKGROUND

As is well known, it is common to input characters by directly touching a keyboard or a keypad on a plane, and a character input method that utilizes a virtual keyboard such as a hologram or the like in a space has been into practical use.

However, these conventional character input methods are not suitable for physically challenged people with hand disabilities because it is required to directly input characters with a touch on a keyboard or a virtual keyboard.

SUMMARY

The present disclosure provides a method and an apparatus for inputting characters based on motion recognition by matching a representative object with a part of a body such as a finger, an eye, and/or a tongue and matching an object group including one or more objects with each representative object.

The present disclosure provides a computer-readable storage medium in which a computer program when executed, that causes a processor to perform a method for inputting characters based on motion recognition is stored.

The present disclosure provides a computer program that is stored in a computer-readable storage medium when executed to cause a processor to perform a method for inputting characters based on motion recognition.

In accordance with a first aspect of the present disclosure, a motion-based character input method is provided. The method includes matching each of representative objects with one of bodies, wherein the representative objects are, respectively, included in object groups. Each of the object groups includes one or more objects. The method further includes: when a first motion of a first body part matched with a representative object among the representative objects is detected, recognizing the representative object as a first input; and when a second motion of a second body part matched with an object in an object group including the representative object is detected after the detection of the first motion, recognizing the object as a second input.

It is preferred that, the motion-based character input method further comprises when the first motion is detected, converting the representative object to a first hologram image and first sound to output the first hologram image and the first sound, and when the second motion is detected, converting the object to a second hologram image and a second sound to output the second hologram image and the second sound.

It is preferred that, the first body part includes a first finger of one hand, and the second body part includes a second finger of the other hand.

It is preferred that, the first motion includes folding and unfolding of the first finger, and the second motion includes folding and unfolding of the second finger.

It is preferred that, the first body part and the second body part include a finger of one hand, the first motion includes folding and unfolding of the finger of the one hand; and the second motion includes folding and unfolding of the finger of the one hand detected after a direction of the one hand is changed.

It is preferred that, the first body part and the second body part include a finger of one hand, the first motion includes folding of the finger of the one hand, and the second motion includes unfolding of the finger of the one hand detected after writing motion of the finger of the one hand.

It is preferred that, the first body part includes a tongue, and the second body part includes an eye.

It is preferred that, the first motion includes sticking out of the tongue in at least one of a forward direction, an upward direction, a downward direction, a leftward direction, and a rightward direction, and the second motion includes opening and closing of both eyes detected after the first motion.

It is preferred that, the first body part includes a tongue, and the second body part includes an eye or the tongue.

It is preferred that, the first motion includes sticking out of the tongue in at least one of a forward direction, an upward direction, a downward direction, a leftward direction, and a rightward direction, and the second motion includes closing of one eye and sticking out of the tongue in at least one of a forward direction, an upward direction, a downward direction, a leftward direction, and a rightward direction which is detected after the first motion.

In accordance with a second aspect of the present disclosure, there is provided a computer-readable storage medium storing a computer program, when executed causing a processor to perform a motion-based character input method. The character input method includes matching each of representative objects with one of bodies, wherein the representative objects are, respectively, included in object groups. Each of the object groups includes one or more objects. The method further includes: when a first motion of a first body part matched with a representative object among the representative objects is detected, recognizing the representative object as a first input; and, when a second motion of a second body part matched with an object in an object group including the representative object is detected after the detection of the first motion, recognizing the object as a second input.

In accordance with a third aspect of the present disclosure, there is provided a motion-based character input apparatus for matching each of a plurality of representative objects with bodies. The plurality of representative objects are, respectively, included in object groups each of which includes one or more objects. The motion-based character input apparatus comprises a first motion detection unit configured to detect a first motion of a first body part matched with a representative object among the plurality of representative objects; a second motion detection unit configured to detect, after the detection of the first motion, a second motion of a second body part matched with a object in an object group including the representative object; and an object input recognition unit configured to recognize the representative object as a first input when the first motion is detected and recognize the object as a second input when the second motion is detected.

It is preferred that, the motion-based character input apparatus further comprises a virtual screen display unit configured to display a hologram image for inputting characters in a space; and an object display unit configured to display character corresponding to the representative object or the specific object that is recognized as an input in a predetermined area of the hologram image.

It is preferred that, a motion of a body part is detected and recognized as characters by matching the representative object with a part of a body such as a finger, an eye, and/or a tongue, and matching an object group including one or more objects with each representative object. Therefore, it is possible to input characters only using body motion without directly inputting characters using a keyboard or a virtual keyboard. Accordingly, even physically challenged people with hand disabilities can effectively and quickly input characters.

BRIEF DESCRIPTION OF THE DRAWINGS

The objects and features of the present disclosure will become apparent from the following description of embodiments, given in conjunction with the accompanying drawings, in which.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Hereinafter, embodiments of the present disclosure will be described in detail with reference to the accompanying drawings.

Figure 1:
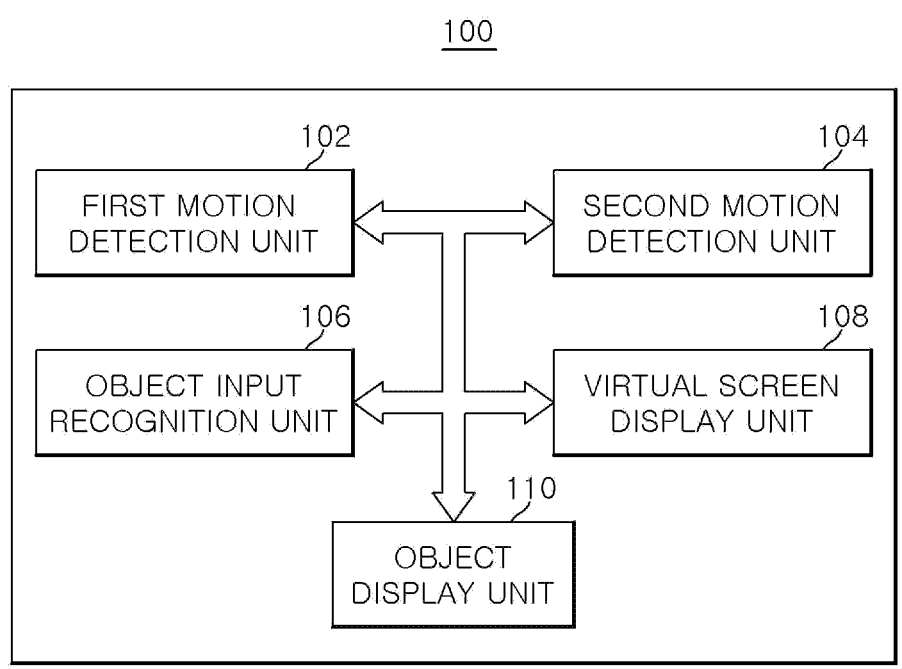
FIG. 1 is a block diagram of an apparatus for inputting characters based on motion recognition according to an embodiment of the present disclosure.

FIG. 1 is a block diagram of an apparatus for inputting characters based on motion recognition according to an embodiment of the present disclosure.

Referring to FIG. 1, a motion-based character input apparatus 100 of the present embodiment includes a first motion detection unit 102, a second motion detection unit 104, and an object input recognition unit 106, a virtual screen display unit 108 and/or an object display unit 110, or the like.

First, in accordance with an embodiment of the present disclosure, a representative object (or representative character) may be matched with a part of a body, e.g., fingers of both hands or one hand, eyes of both eyes, and/or a tongue. Each representative object can be matched with an object group including one or more objects (or characters). Each object included in the object group can be matched with a part of a body. Here, a body part matched with each representative object can be defined as a first body part that provides first motion, and a body part matched with each object can be defined as a second body part that provides second motion. The first body part and the second body part may be different body parts (e.g., fingers of a left hand and fingers of a right hand) or the same body part (fingers of a left or a right hand).

Referring to FIG. 1, the first motion detection unit 102 can detect first motion of an arbitrary body part (first body part) matched with a specific representative object. Therefore, the first motion detection unit 102 selectively uses, e.g., a camera sensor, an ultrasonic sensor, an infrared sensor, a three-dimensional motion recognition sensor, a gyroscope sensor, and/or multi-hovering. The detected first motion of the first body part can be transmitted to the second motion detection unit 104 and the object input recognition unit 106.

In accordance with the first embodiment and the second embodiment of the present disclosure, the first motion of the first body part (e.g., finger of a hand) detected in the first motion detection unit 102 by a user's motion interface may be folding and unfolding of a specific finger (first specific finger) of one hand (e.g., left hand).

In accordance with the third embodiment of the present disclosure, the first motion of the first body part (e.g., finger of a hand) detected in the first motion detection unit 102 by the user's motion interface may be folding of a specific finger of one hand (e.g., left hand).

In accordance with the fourth embodiment and the fifth embodiments of the present disclosure, the first motion of the first body part (e.g., tongue) detected in the first motion detection unit 102 by the user's motion interface may be sticking out of the tongue in at least one of a forward direction, an upward direction, a downward direction, a leftward direction, and/or a rightward direction.

In accordance with the embodiments of the present disclosure, the second motion detection unit 104 can detect the second motion of the second body part matched with the specific object in the object group matched with the representative object after the detection of the first motion of the first body part. Therefore, the second motion detection unit 104 selectively uses, e.g., a camera sensor, an ultrasonic sensor, an infrared sensor, a three-dimensional motion recognition sensor, a gyroscope sensor, and/or multi-hovering. The second motion of the second body part detected by the second motion detection unit 104 can be transmitted to the object input recognition unit 106.

In accordance with the first embodiment of the present disclosure, the second motion of the second body part (e.g., finger of a hand) detected in the second motion detection unit 104 by user's motion interface after the detection of the first motion may be folding and unfolding of a specific finger (second specific finger) of the other hand (e.g., right hand).

In accordance with the second embodiment of the present disclosure, the second motion of the second body part (e.g., finger of a hand) detected in the second motion detection unit 104 by the user's motion interface after the detection of the first motion may be folding and unfolding of a specific finger of one hand (i.e., left hand as in the first embodiment) detected after the change of the direction (e.g., clockwise or counterclockwise rotation) of one hand.

In accordance with the third embodiment of the present disclosure, the second motion of the second body part (e.g., finger of a hand) detected in the second motion detection unit 104 by the user's motion interface after the detection of the first motion may be unfolding of a specific finger detected after writing motion of a specific finger of one hand (i.e., left hand as in the first embodiment).

In accordance with the fourth embodiment of the present disclosure, the second motion of the second body part (tongue) detected in the second motion detection unit 104 by the user's motion interface may be opening and closing of both (left and right) eyes detected after the first motion of the second body part.

In accordance with the fifth embodiment of the present disclosure, the second motion of the second body part (tongue) detected in the second motion detection unit 104 by the user's motion interface may be closing of one (left or right) eye and sticking out of the tongue in at least one of the forward direction, the upward direction, the downward direction, the leftward direction, and/or the rightward direction which is detected in the second motion detection unit 104 by the user's motion interface after the detection of the first motion of the first body part.

When only the first motion of the first boy is detected by the first motion detection unit 102 within a preset period of time, the object input recognition unit 106 can recognize, as an input, the representative object (representative character) matched with the first body part and transmit the representative object to the object display unit 110. Further, when the second motion of the second body part is detected by the second motion detection unit 104 within a preset period of time after the detection of the first motion of the first body part by the first motion detection unit 102, the object input recognition unit 106 can recognize, as an input, the object (character) matched with the second body part and transmit the object to the object display unit 110. The virtual screen display unit 108 can display a hologram image for inputting characters, i.e., a hologram image for visually displaying a character recognized as an input in an arbitrary space.

The object display unit 110 can visually display an arbitrary representative object (representative character) recognized as an input by the object input recognition unit 106 or an arbitrary object (character) in an object group matched with the arbitrary representative object in a predetermined area (i.e., character output area) of the hologram image, and convert it into sound.

The following is detailed description of a main process of inputting characters based on motion recognition of the present disclosure using the character input apparatus of the present embodiment that is configured as described above.

Figure 2:
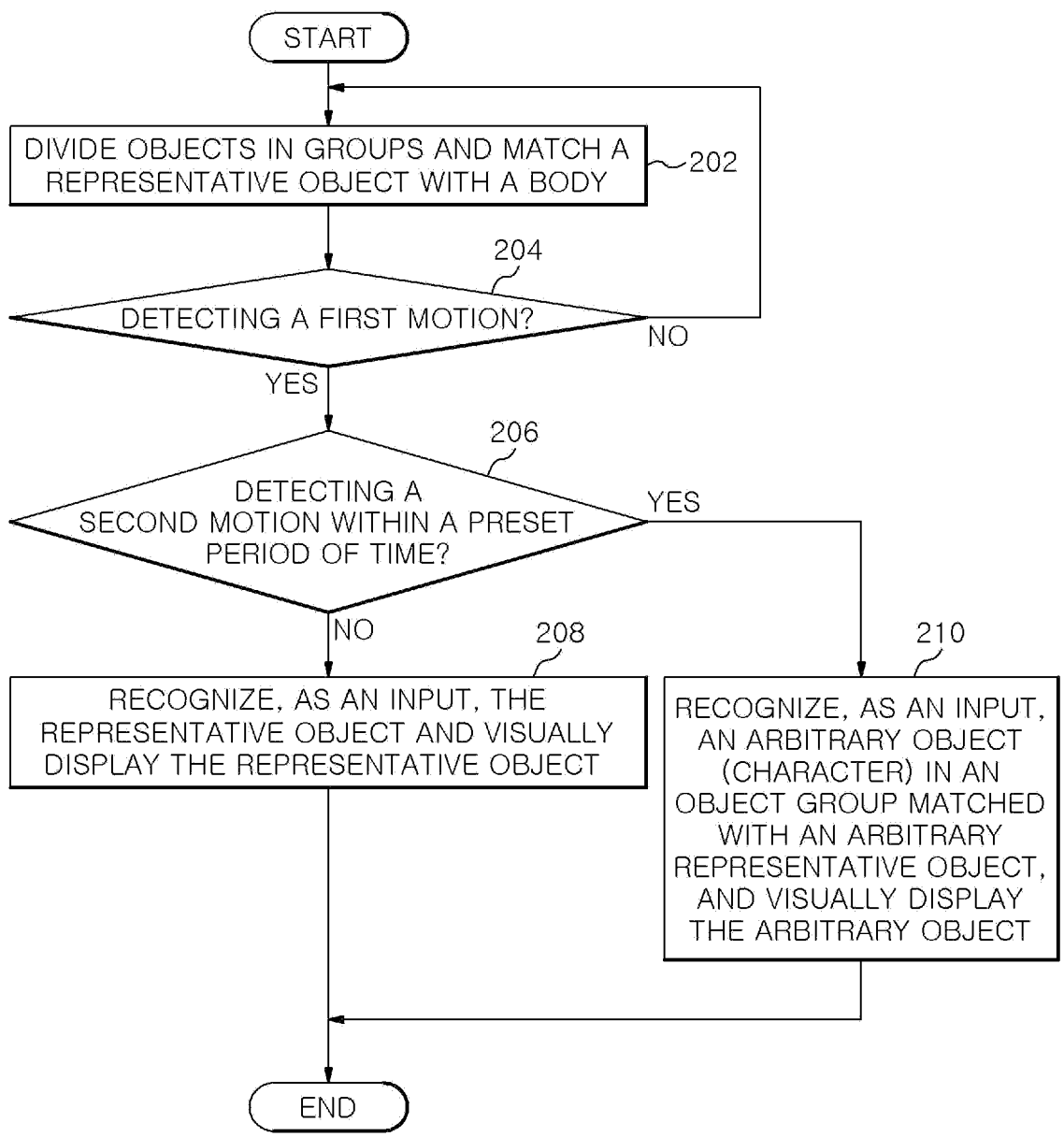
FIG. 2 is a flowchart showing a main process of inputting characters based on motion recognition according to an embodiment of the present disclosure.

FIG. 2 is a flowchart showing a main process of inputting characters based on motion recognition according to an embodiment of the present disclosure.

Referring to FIG. 2, the motion-based character input apparatus 100 can divide objects in groups and match a representative object with a body part (step 202).

For example, in the step 202, each representative object (or each representative character) can be matched with a part of a body, e.g., fingers of both hands or one hand, eyes of both eyes, and/or a tongue; each representative object can be matched with an object group including one or more objects (or characters); and the objects included in each object group can be matched with a part of a body.

The first motion detection unit 102 selectively uses, e.g., a camera sensor, an ultrasonic sensor, an infrared sensor, a three-dimensional motion recognition sensor, a gyroscope sensor, and/or multi-hovering to determine whether or not first motion of an arbitrary body part (first body part) matched with a specific representative object has occurred (step 204).

In accordance with the first embodiment and the second embodiments of the present disclosure, the first motion of the first body part (e.g., finger of a hand) detected in the first motion detection unit 102 by the user's motion interface may be folding and unfolding a specific finger (first specific finger) of one hand (e.g., left hand).

In accordance with the third embodiment of the present disclosure, the first motion of the first body part (e.g., finger of a hand) detected in the first motion detection unit 102 by the user's motion interface may be folding of a specific finger of one hand (e.g., left hand).

In accordance with the fourth embodiment and the fifth embodiment of the present disclosure, the first motion of the first body part (e.g., finger of a hand) detected in the first motion detection unit 102 by the user's motion interface may be sticking out of the tongue in at least one of a forward direction, an upward direction, a downward direction, a leftward direction, and/or a rightward direction.

If it is determined in the step 204 that the first motion of an arbitrary body part is detected, the second motion detection unit 104 detects whether or not second motion has occurred within a preset period of time after the detection of the first motion of the first body part (step 206).

In accordance with the first embodiment of the present disclosure, the second motion of the second body part (e.g., finger of a hand) detected in the second motion detection unit 104 by the user's motion interface after the detection of the first motion may be folding and unfolding of a specific finger (second specific finger) of the other hand (e.g., right hand).

In accordance with the second embodiment of the present disclosure, the second motion of the second body part (e.g., finger of a hand) detected in the second motion detection unit 104 by the user's motion interface after the detection of the first motion may be folding and unfolding of a specific finger of one hand (i.e., left hand as in the first embodiment) detected after the change of the direction (e.g., clockwise or counterclockwise rotation) of one hand.

In accordance with the third embodiment of the present disclosure, the second motion of the second body part (e.g., finger of a hand) detected in the second motion detection unit 104 by the user's motion interface after the detection of the first motion may be unfolding of a specific finger detected after the writing motion of the specific finger of one hand (i.e., left hand as in the first embodiment).

In accordance with the fourth embodiment of the present disclosure, the second motion of the second body part (tongue) detected in the second motion detection unit 104 by the user's motion interface may be opening and closing of both (left and right) eyes detected after the first motion of the first body part.

In accordance with the fifth embodiment of the present disclosure, the second motion of the second body part (tongue) detected in the second motion detection unit 104 by the user's motion interface may be closing of one (left or right) eye and sticking out of the tongue in at least one of a forward direction, an upward direction, a downward direction, a leftward direction, and/or a rightward direction which is detected after the first motion of the first body part.

If it is checked in the step 206 that the second motion is not detected within the preset period of time, the input object recognition unit 106 recognizes, as an input, the representative object (representative character) matched with the first body part, and the object display unit 110 visually displays the representative object in a predetermined area (i.e., character output area) of the hologram image (step 208).

Here, the hologram image for inputting characters may be a hologram screen displayed in an arbitrary space through the user's motion interface by the virtual screen display unit 108.

If it is checked in the step 206 that the second motion is detected within the preset period of time, the object input recognition unit 106 recognizes, as an input, an arbitrary object (character) in an object group matched with an arbitrary representative object, and the object display unit 110 visually displays the arbitrary object (character) in a predetermined area (e.g., character output area) of the hologram image (step 210).

Figure 3:
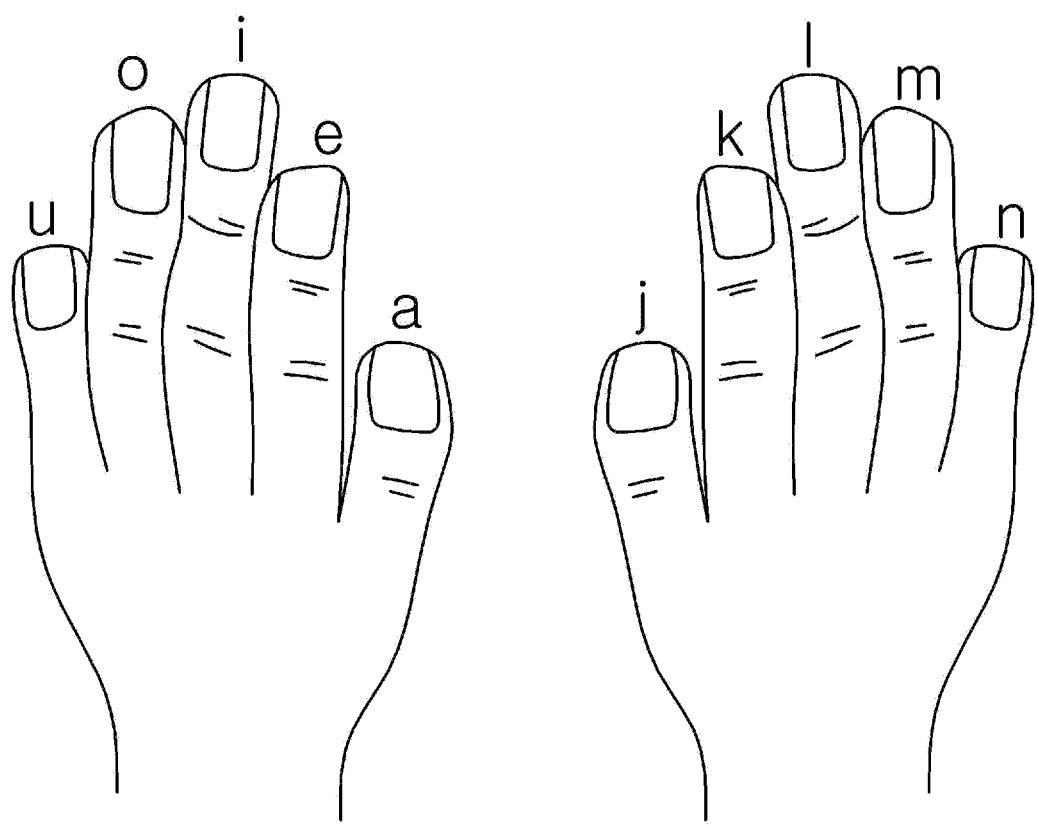
FIG. 3 shows an example for explaining principle of inputting characters based on body motion recognition according to a first embodiment of the present disclosure.

FIG. 3 shows an example for explaining principle of inputting characters based on body motion recognition according to a first embodiment of the present disclosure;

Referring to FIG. 3, when fingers of a specific one hand are folded and unfolded and, then, fingers of the other hand are folded and unfolded, alphabetical characters are inputted by the character input apparatus 100.

In other words, FIG. 3 shows an example in which the character input apparatus 100 of the present embodiment recognizes a specific representative alphabet as an input in the case of detecting the motion of the first body part, i.e., folding and unfolding of a finger of a left hand matched with the representative alphabet, and recognizes a specific alphabet as an input in the case of detecting the motion of the second body part, i.e., folding and unfolding of a finger of a right hand matched with the specific alphabet, after the detection of the motion of the first body part.

As shown in FIG. 3, the character input apparatus 100 can match representative characters "a, e, i, o, u" (representative objects) with the fingers of the left hand in that order from the first finger (e.g., thumb) to the fifth finger (e.g., little finger). Further, the character input apparatus 100 can recognize the representative characters as an input in the case of folding and unfolding the fingers of the left hand and recognize characters included in each representative characters as an input in the case of folding and unfolding the fingers of the right hand.

For example, in the case of inputting alphabets, when a user fold and unfolds a first finger of the left hand, the character input apparatus 100 recognizes the representative character "a" as an input; when the user folds and unfolds a second finger of the left hand, the character input apparatus 100 recognizes the representative character "e" as an input; when the user folds and unfolds a third finger of the left hand, the character input apparatus 100 recognizes the representative character "i" as an input; when the user folds and unfolds a fourth finger of the left hand, the character input apparatus 100 recognizes the representative character "o" as an input; and when the user folds and unfolds a fifth finger of the left hand, the character input apparatus 100 recognizes the representative character "u" as an input. In this manner, the respective representative characters can be recognized as an input.

When the user folds and unfolds the fingers of the right hand after the representative characters matched with the fingers of the left hand are recognized, the character input apparatus 100 recognizes the characters included in the recognized representative character group as an input. In other words, when the user fold and unfolds the first finger of the right hand after "a" is recognized by folding and unfolding the first finger of the left hand, the character input apparatus 100 recognizes "b" as an input; when the user folds and unfolds the second finger of the right hand after "a" is recognized, the character input apparatus 100 recognizes "c" as an input; when the user folds and unfolds the third finger of the right hand after "a" is recognized, the character input apparatus 100 recognizes "d" as an input; when the user folds and unfolds the fourth finger of the right hand after "a" is recognized, the character input apparatus 100 recognizes a space key that is a function key as an input; and when the user folds and unfolds the fifth finger of the right hand after "a" is recognized, the character input apparatus 100 recognizes a backspace key that is a function key as an input.

When the user folds and unfolds the first finger of the right hand after the character input apparatus 100 recognizes "e" as an input by the folding and unfolding of the second finger of the left hand, the character input apparatus 100 recognizes "f" as an input. When the user folds and unfolds the second finger of the right hand after "e" is recognized, the character input apparatus 100 recognizes "g" as an input. When the user folds and unfolds the third finger of the right hand after "e" is recognized, the character input apparatus 100 recognizes "h" as an input. When the user folds and unfolds the fourth finger of the right hand after "e" is recognized, the character input apparatus 100 recognizes a shift key that is a function key as an input. When the user folds and unfolds the fifth finger of the right hand after "e" is recognized, the character input apparatus 100 recognizes an enter key that is a function key as an input.

When the user folds and unfolds the first finger of the right hand after "i" is recognized as an input by folding and unfolding the third finger of the left hand, the character input apparatus 100 recognizes "j" as an input. When the user folds and unfolds the second finger of the right hand after "i" is recognized, the character input apparatus 100 recognizes "k" as an input. When the user folds and unfolds the third finger of the right hand after "i" is recognized, the character input apparatus 100 recognizes "l" as an input. When the user folds and unfolds the fourth finger of the right hand after "i" is recognized, the character input apparatus 100 recognizes "m" as an input. When the user folds and unfolds the fifth finger of the right hand after "i" is recognized, the character input apparatus 100 recognizes "n" as an input.

When the user folds and unfolds the first finger of the right hand after "o" is recognized as an input by folding and unfolding the fourth finger of the left hand, the character input apparatus 100 recognizes "p" as an input. When the user folds and unfolds the second finger of the right hand after "o" is recognized, the character input apparatus 100 recognizes "q" as an input. When the user folds and unfolds the third finger of the right hand after "o" is recognized, the character input apparatus 100 recognizes "r" as an input.

When the user folds and unfolds the fourth finger of the right hand after "o" is recognized, the character input apparatus 100 recognizes "s" as an input. When the user folds and unfolds the fifth finger of the right hand after "o" is recognized, the character input apparatus 100 recognizes "t" as an input.

When the user folds and unfolds the first finger of the right hand after "u" is recognized as an input by folding and unfolding the fifth finger of the left hand, the character input apparatus 100 recognizes "v" as an input. When the user folds and unfolds the second finger of the right hand after "u" is recognized, the character input apparatus 100 recognizes "w" as an input. When the user folds and unfolds the third finger of the right hand after "u" is recognized, the character input apparatus 100 recognizes "x" as an input. When the user folds and unfolds the fourth finger of the right and after "u" is recognized, the character input apparatus 100 recognizes "y" as an input. When the user folds and unfolds the fifth finger of the right hand after "u" is recognized, the character input apparatus 100 recognizes "z" as an input.

When the user folds and unfolds the first finger of the right hand after the character input apparatus 100 recognizes the representative character "i" as an input by the folding and unfolding of the third finger of the left hand, the character input apparatus 100 recognizes "j" as an input. When the user folds and unfolds the second finger of the right hand after "i" is recognized, the character input apparatus 100 recognizes the character "k" as an input. When the user folds and unfolds the third finger of the right hand after "i" is recognized, the character input apparatus 100 recognizes the character "l" as an input. When the user folds and unfolds the fourth finger of the right hand after "i" is recognized, the character input apparatus 100 recognizes the character "m" as an input. When the user folds and unfolds the fifth finger of the right hand after "i" is recognized, the character input apparatus 100 recognizes the character "n" as an input.

On the other hand, in the case of inputting Korean, when the user folds and unfolds the first finger of the left hand, the character input apparatus 100 recognizes a representative consonant "ㄱ" as an input. When the user folds and unfolds the second finger of the left hand, the character input apparatus 100 recognizes a representative consonant "ㅅ" as an input. When the user folds and unfolds the third finger of the left hand, the character input apparatus 100 recognizes a representative vowel "ㅏ" as an input. When the user folds and unfolds the fourth finger of the left hand, the character input apparatus 100 recognizes aspirated consonants and hard consonants of the recognized consonants, and/or a middle vowel of the recognized vowel.

When the fingers of the right hand are folded after the representative characters matched with the fingers of the left hand are recognized, the character input apparatus 100 recognizes the characters included in the recognized representative character group.

In other words, when the user folds and unfolds the first finger of the right hand after the character input apparatus 100 recognizes "ㄱ" as an input by the user's folding and unfolding of the first finger of the left hand, the character input apparatus 100 recognizes "s" as an input. When the user folds and unfolds the second finger of the right hand after "ㄱ" is recognized, the character input apparatus 100 recognizes "ㄷ=" as an input. When the user folds and unfolds the third finger of the right hand after "ㄱ" is recognized, the character input apparatus 100 recognizes "ㄹ" as an input. When the user folds and unfolds the first finger of the right hand after the character input apparatus 100 recognizes "ㄱ" as an input by the user's folding and unfolding of the first finger of the left hand, the character input apparatus 100 recognizes "ㄴ" as an input. When the user folds and unfolds the second finger of the right hand after "ㄱ" is recognized, the character input apparatus 100 recognizes "ㄷ" as an input. When the user folds and unfolds the third finger of the right hand after "ㄱ" is recognized, the character input apparatus 100 recognizes "ㄹ" as an input. When the user folds and unfolds the fourth finger of the right hand after "ㄱ" is recognized, the character input apparatus 100 recognizes "ㅁ" as an input. When the user folds and unfolds the fifth finger of the right hand after "ㄱ" is recognized, the character input apparatus 100 recognizes "ㅂ" as an input. When the user folds and unfolds the first finger of the right hand after the character input apparatus 100 recognizes "ㅅ" as an input by the user's folding and unfolding of the second finger of the left hand, the character input apparatus 100 recognizes "ㅇ" as an input. When the user folds and unfolds the second finger of the right hand after "ㅅ" is recognized, the character input apparatus 100 recognizes "ㅈ" as an input. When the user folds and unfolds the third finger of the right hand after "ㅅ" is recognized, the character input apparatus 100 recognizes "ㅎ" as an input.

In the case of vowel recognition, when the user folds and unfolds the first finger of the right hand after the character input apparatus 100 recognizes "ㅏ" as an input by the user's folding and unfolding of the third finger of the left hand, the character input apparatus 100 recognizes "ㅓ" as an input. When the user folds and unfolds the second finger of the right hand after "ㅏ" is recognized, the character input apparatus 100 recognizes "ㅗ" as an input. When the user folds and unfolds the third finger of the right hand after "ㅏ" is recognized, the character input apparatus 100 recognizes "ㅜ" as an input. When the user folds and unfolds the fourth finger of the right hand after "ㅏ" is recognized, the character input apparatus 100 recognizes "ㅡ" as an input. When the user folds and unfolds the fifth finger of the right hand after "ㅏ" is recognized, the character input apparatus 100 recognizes "ㅣ" as an input.

When the user folds and unfolds the fourth finger of the left hand after the consonant recognition, the character input apparatus 100 recognizes the aspirated consonant of the recognized consonant as an input. At this time, if the user folds and unfolds the first finger of the right hand, the character input apparatus 100 can recognize the aspirated consonant as an input.

When the user folds and unfolds the fourth finger of the left hand after the vowel recognition, the character input apparatus 100 recognizes the middle vowel of the recognized vowel as an input. At this time, whenever the fingers of the right hand are folded and unfolded from the first finger to the fifth finger, the middle vowels can be recognized as an input in a dictionary order.

For example, when the user folds and unfolds the second finger of the left hand, the character input apparatus 100 recognizes the representative character "ㅅ" as an input. When the user folds and unfolds the first finger of the right hand, the character input apparatus 100 recognizes the character "ㅇ" as an input. When the user folds and unfolds the third finger of the left hand, the character input apparatus 100 recognizes the representative vowel "ㅏ" as an input. In other words, the user folds and unfolds the third finger of the left hand after the representative character "ㅅ" is recognized, the character input apparatus 100 recognizes the representative vowel "ㅏ" as an input. At this time, if the user folds and unfolds the fourth finger of the left hand, the representative vowel "ㅏ" is converted to a middle vowel and the character input apparatus 100 recognizes "ㅑ" as an input. When the user folds and unfolds the first finger of the right hand, the character input apparatus 100 recognizes "ㅒ" as an input.

When the user folds and unfolds the fifth finger of the right hand, the character input apparatus 100 recognizes the space key that is a function key as an input. When the user folds and unfolds the first finger of the right hand, the character input apparatus 100 recognizes a backspace key that is a function key as an input. When the user folds and unfolds the second finger of the right hand, the character input apparatus 100 recognizes an enter key that is a function key as an input.

In the case of inputting English and Korean, when the user folds and unfolds the first finger of the left hand for a while, the character input apparatus 100 can convert the character input method from the representative character input method to the representative number and/or mark input method.

In other words, it is possible to assign (match) the fingers of the left hand with the representative numbers and the representative marks "0, 6, ?, !, and ^" from the first finger to the fifth finger and to match the fingers of the right hand with the numbers included in the representative numbers and the marks included in the representative marks.

In accordance with the present embodiment, unlike the method of matching the representative objects of the fingers of the left hand with the object groups of the fingers of the right hand, it is possible to input characters in such a manner that the object groups are recognized in a forward direction by folding and unfolding the first finger of the right hand and in a backward direction by folding and unfolding the second finger of the right hand.

For example, when the user folds and unfolds the first finger of the right hand once after the character input apparatus 100 recognizes the representative object "i" as an input by the user's folding and unfolding of the third finger of the left hand, the character input apparatus 100 recognizes "j" as an input; when the user folds and unfolds the first finger of the right hand twice, the character input apparatus 100 recognizes "k" as an input; and when the user folds and unfolds the first finger of the right hand three times, the character input apparatus 100 recognizes "l". In this manner, the characters of the object group can be recognized in the forward direction. On the other hand, when the user folds and unfolds the second finger of the right hand once after "i" is recognized, the character input apparatus 100 recognizes "h"; when the user folds and unfolds the second finger of the right hand twice, the character input apparatus 100 recognizes "g"; and when the user folds and unfolds the second finger of the right hand three times, the character input apparatus 100 recognizes "f". In this manner, the characters of the object group can be recognized in the backward direction.

At this time, when the motion of the body part (finger) is detected and recognized as an input, the character input apparatus 100 can display it on a flat display or in a space through laser projection, a hologram, or the like, and can output it as sound.

Figure 4:
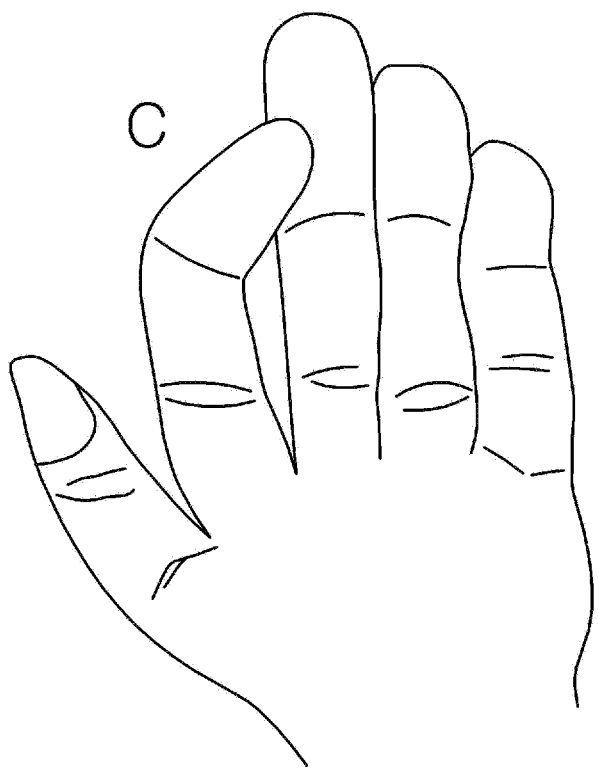
FIG. 4 shows an example for explaining principle of inputting characters based on body motion recognition according to a second embodiment of the present disclosure.

FIG. 4 shows an example for explaining principle of inputting characters based on body motion recognition according to a second embodiment of the present disclosure.

FIG. 4 shows an example in which the character input apparatus 100 of the present embodiment recognizes a specific representative alphabet as an input in the case of detecting the motion of the first body part, i.e., folding and unfolding of a fingers of the left hand matched with the specific representative alphabet, and recognizes a specific alphabet as an input in the case of detecting, after the detection of the motion of the first body part, the motion of the second body part, i.e., folding and unfolding of a finger of the left hand after the change of the direction of the left hand matched with the specific alphabet.

In other words, the user can input characters using one hand by rotating the left hand in a counterclockwise direction without using the right hand.

Unlike the method of matching the representative objects of the fingers of the left hand with the object groups of the fingers of the right hand, the character input apparatus 100 can input characters by recognizing the object groups in the forward direction in the case of folding and unfolding the first finger of the left hand after the counterclockwise rotation of the left hand and by recognizing the object groups in the backward direction in the case of folding and unfolding the second finger of the left hand.

Figure 5:
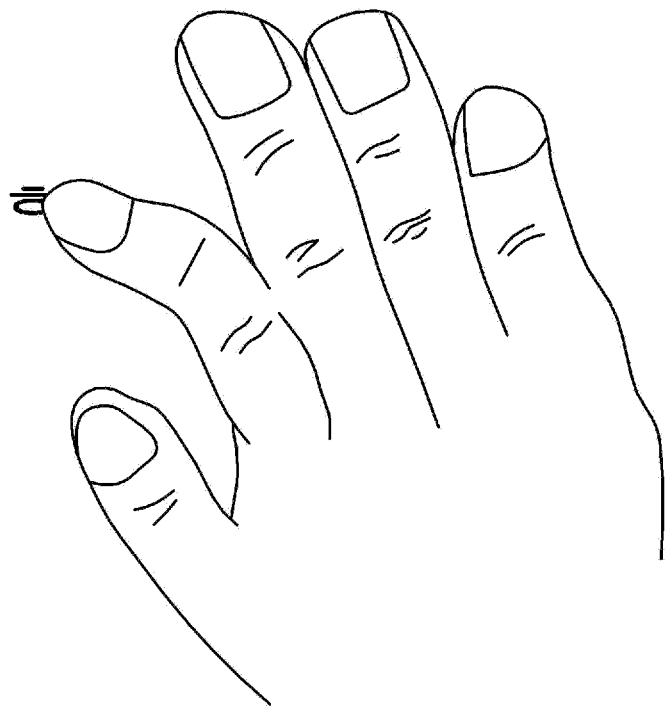
FIG. 5 shows an example for explaining principle of inputting characters based on body motion recognition according to a third embodiment of the present disclosure.

FIG. 5 shows an example for explaining principle of inputting characters based on body motion recognition according to a third embodiment of the present disclosure.

In other words, FIG. 5 shows an example in which the character input apparatus 100 of the present embodiment recognizes a specific representative alphabet as an input in the case of detecting the motion of the first body part, i.e., folding and unfolding of a finger of the left hand matched with the specific representative alphabet, and recognizes a specific alphabet as an input in the case of detecting, after the motion of the first body part, the motion of the second body part, i.e., folding and unfolding of a finger of the left hand after the writing motion of the left hand matched with the specific alphabet.

The first finger of the right hand is matched with the space key that is the representative function key; the second finger of the right hand is matched with the first representative alphabet character "a"; the third finger of the right hand is matched with the second representative alphabet character "n"; the fourth finger of the right hand is matched with the representative numeral object "1"; and the fifth finger of the right hand is matched with the representative mark object. When the user folds the fingers of the left hand, the representative objects are recognized by the character input apparatus 100.

When the user moves a folded finger vertically or horizontally, the character input apparatus 100 recognizes the function key as an input. When the user unfolds the folded finger after the writing motion, the character input apparatus 100 recognizes the representative character, number, mark or the like as an input.

In the case of inputting Korean, the first finger is matched with the space key that is the representative function key; the second finger is matched with the representative consonant "ㄱ"; the third finger is matched with the representative vowel "ㅏ"; the fourth finger is matched with the representative numeral object "1"; and the fifth finger is matched with the representative mark object. When the fingers of the right hand are folded, the character input apparatus 100 recognizes the representative objects. When the user moves the folded finger vertically or horizontally, the character input apparatus 100 recognizes the function key as an input. When the user unfolds the folded finger after the writing motion, the character input apparatus 100 recognizes the representative character, number, mark or the like as an input.

Referring to FIG. 5, a consonant "ㅎ" is inputted by folding the second finger of the right hand.

In the case of inputting English and Korean, the space key is recognized when the first finger is folded and unfolded; the backspace key is recognized when the first finger is folded, moved rightward, and unfolded; the enter key is recognized when the first finger is folded, moved leftward, and unfolded; the shift key is recognized when the first finger is folded, moved upward, and unfolded; and the conversion key is recognized when the first finger is folded, moved downward, and unfolded.

Figure 6:
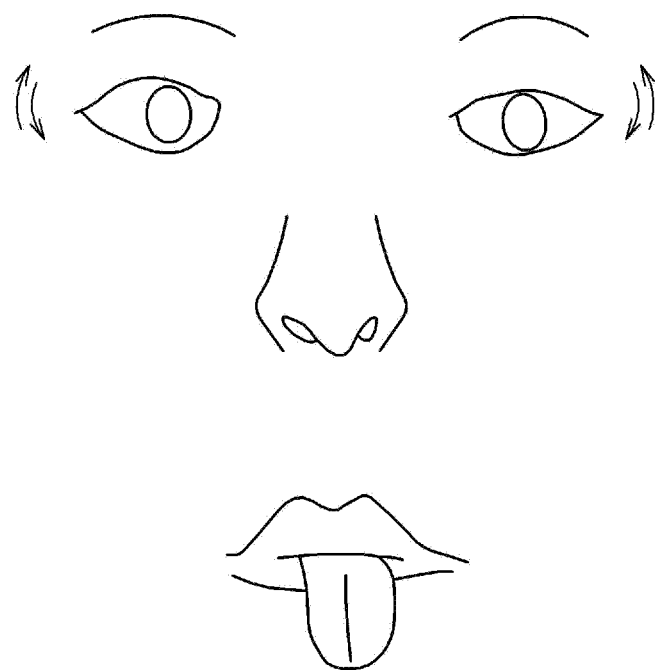
FIG. 6 shows an example for explaining principle of inputting characters based on body motion recognition according to a fourth embodiment of the present disclosure.

FIG. 6 shows an example for explaining principle of inputting characters based on body motion recognition according to a fourth embodiment of the present disclosure.

In other words, FIG. 6 shows an example in which the character input apparatus 100 of the present embodiment recognizes a specific representative object as an input in the case of detecting the motion of the first body part, i.e., sticking out of a tongue in at least one of the forward direction, the upward direction, the downward direction, the leftward direction, and the rightward direction, and recognizes a specific alphabet as an input in the case of detecting, after the detection of the motion of the first body part, the motion of the second body part, i.e., opening and closing of both eyes matched with the specific alphabet.

When the user sticks out the tongue forward and pulling it back, the character input apparatus 100 recognizes the representative character "a" as an input. When the user sticks out the tongue leftward and pulls it back, the character input apparatus 100 recognizes the representative character "e" as an input. When the user sticks out the tongue upward and pulls it back, the representative character "i" is recognized as an input. When the user sticks out the tongue rightward and pulls it back, the representative character "o" is recognized as an input. When the user sticks out the tongue downward and pulls it back, the representative character "u" is recognized as an input. In a state where the representative character is recognized as an input, when the user closes the right eye for a preset period of time and then opens the right eye, the character input apparatus 100 can recognize the object groups in a forward direction. When the user closes the left eye for a preset period of time and opens the left eye, the character input apparatus 100 can recognize the object groups in a backward direction.

For example, whenever the user closes the left eye for a preset period of time and opens the left eye after the representative character "i" is recognized by the user's sticking out of the tongue upward and pulling it back, the character input apparatus 100 recognizes the character objects "j, k, l, m, n, and o" in the forward direction. Whenever the user closes the right eye for a preset period of time and opens the right eye, the character input apparatus 100 recognizes the character objects "h, g, f, and e" in the backward direction.

In the case of Korean, when the user sticks out the tongue forward and pulls it back, the character input apparatus 100 recognizes the first representative consonant "ㄱ"; when the user sticks out the tongue leftward and pulling it back, the character input apparatus 100 recognizes the second representative consonant "ㅅ"; when the user sticks out the tongue upward and pulls it back, the character input apparatus 100 recognizes the representative vowel "ㅏ"; and when the user sticks out the tongue rightward and pulls it back, the character input apparatus 100 converts the representative consonants to aspirated consonants and hard consonants and the representative vowel to a middle vowel. When the user opens both eyes and sticks out the tongue and pulls it back in a state where the representative characters are recognized, the character input apparatus 100 recognizes the object characters included in the representative character group.

For example, whenever the user closes the left eye for a preset period of time and opens the left eye after "ㅅ" is recognized by the user's sticking out of the tongue leftward, the character input apparatus 100 recognizes as an input the characters "ㅇ, ㅈ, and ㅎ" in the forward direction. Whenever the user closes the right eye for a preset period of time and opens the right eye, the character input apparatus 100 recognizes the characters "ㅂ, ㅁ, ㄹ, ㄷ, ㄴ, and ㄱ" in the backward direction.

When the user closes both eyes for a preset period of time and opens both eyes, the character input apparatus 100 can convert the character input method from the representative character input method to the representative number/mark/function key input method.

In other words, in the case of inputting representative characters of English and Korean, when the user closes both eyes for a preset period of time and opens both eyes, and then sticks out the tongue forward and pulls it back, the character input apparatus 100 recognizes the space key that is the representative function key. When the user sticks out the tongue leftward and pulls it back, the character input apparatus 100 recognizes the first representative number "1". When the user sticks out the tongue upward and pulls it back, the character input apparatus 100 recognizes the second representative number "6". When the user sticks out the tongue leftward and pulls it back, the character input apparatus 100 recognizes the first representative mark "!". When the user sticks out the tongue downward and pulls it back, the character input apparatus 100 recognizes the representative function key, number, mark such as a second representative mark "^" or the like. Whenever the user closes the left eye for a preset period of time and opens the left eye after "1" is recognized by the user's sticking out of the tongue leftward, the character input apparatus 100 recognizes the numbers "2, 3, 4, and 5" in that order. Whenever the user closes the right eye for a preset period of time and opens the right eye, the character input apparatus 100 recognizes the numbers "0, 9, 8, 7, and 6" in that order.

Figure 7:
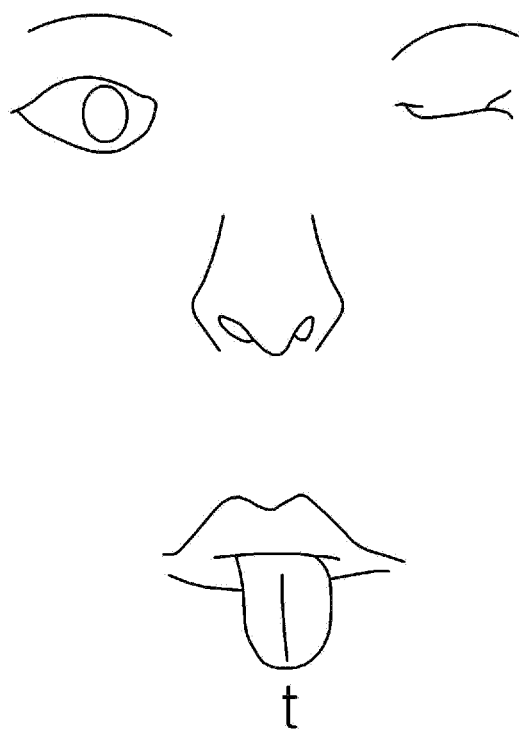
FIG. 7 shows an example for explaining principle of inputting characters based on body motion recognition according to a fifth embodiment of the present disclosure.

FIG. 7 shows an example for explaining principle of inputting characters based on body motion recognition according to a fifth embodiment of the present disclosure.

In other words, FIG. 7 shows an example in which the character input apparatus 100 of the present embodiment recognizes a specific representative object as an input in the case of detecting the motion of the first body part, i.e., sticking out of the specific tongue matched with the specific representative alphabet in at least one of the forward direction, the upward direction, the downward direction, the leftward direction, and/or the rightward direction, and recognizes a specific alphabet in the case of detecting, after the detection of the motion of the first body part, the motion of the second body part, i.e., closing of the left eye matched with the specific alphabet and sticking out of the tongue in at least one of the forward direction, the upward direction, the downward direction, the leftward direction, and/or the rightward direction. When the user sticks out the tongue forward and pulls it back, the character input apparatus 100 recognizes the representative character "a". When the user sticks out the tongue leftward and pulls it back, the character input apparatus 100 recognizes the representative character "e". When the user sticks out the tongue upward and pulls it back, the character input apparatus 100 recognizes the representative character "i". When the user sticks out the tongue rightward and pulls it back, the character input apparatus 100 recognizes the representative character "o". When the user sticks out the tongue downward and pulls it back, the character input apparatus 100 recognizes the representative character "u". When the user closes the left eye and sticks out the tongue in one of the forward direction, the upward direction, the downward direction, the leftward direction, and/or the rightward direction in a state where the representative character is recognized, the character input apparatus 100 recognizes one of the object characters included in the representative object group as an input.

For example, when the user closes the left eye and sticks out the tongue forward, upward, downward, leftward, and rightward after the character "i" is recognized by the user's sticking out of the tongue upward and pulling it back, the character input apparatus 100 recognizes the character objects "j, k, l, m, and n" in that order.

In other words, FIG. 7 shows an example in which the character input apparatus 100 recognizes an object alphabet "t" when the user closes the left eye and sticks out the tongue downward and pulls it back after the representative alphabet "o" is recognized by the user's sticking out of the tongue rightward and pulling it back.

In the case of Korean, when the user sticks out the tongue forward and pulls it back, the character input apparatus 100 recognizes the first representative consonant "ㄱ". When the user sticks out the tongue leftward and pulls it back, the character input apparatus 100 recognizes the second representative consonant "ㅅ". When the user sticks out the tongue upward and pulls it back, the character input apparatus 100 recognizes the representative vowel "ㅏ". When the user sticks out the tongue rightward and pulls it back, the character input apparatus 100 converts the representative consonants to aspirated constants and hard consonants and the representative vowel to a middle vowel. When the user closes the left eye and sticks out the tongue and pulls it back in a state where the representative character is recognized, the character input apparatus 100 recognizes the object characters included in the representative character group. For example, when the user closes the left eye and sticks out the tongue forward, upward, downward, leftward and rightward and pulls it back after "ㄱ" is recognized by the user's sticking out of the tongue forward, the character input apparatus 100 recognizes the characters "ㄴ, ㄷ, ㄹ, ㅁ, and ㅂ" in that order.

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

For example, in accordance with an aspect of the present disclosure, there may be provided a computer-readable recording medium having a computer program stored therein for causing a processor to perform a hologram-based character recognition method in which one or more representative characters are respectively matched to one or more fingers and a group of characters including one or more character objects is matched to each of one or more representative characters, the hologram-based character recognition method including: displaying, when a first movement of a predetermined finger among the one or more fingers is detected, in a space a hologram image in which a predetermined representative character among the one or more representative characters matched to the predetermined finger is arranged at a center of the hologram image and the one or more character objects included in the group matched to the predetermined representative character are arranged around the specific representative object; recognizing the predetermined representative character as an input when a second movement of the predetermined finger is detected; and recognizing one of the one or more character objects as an input when the second movement of the predetermined finger is detected after the predetermined finger is dragged or moved to said one of the one or more character objects.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments.

Therefore, the protection scope of the present disclosure should be interpreted based on the following claims and it should be appreciated that all technical scopes included within a range equivalent thereto are included in the protection scope of the present disclosure.

The invention claimed is:

1. A motion-based character input method, comprising:
matching each of a plurality of representative objects with one of a plurality of bodies, wherein the plurality of representative objects are, respectively, included in object groups each of which includes one or more objects;

recognizing, when a first motion of a first body part matched with a representative object among the plurality of representative objects is detected, the representative object as a first input; and recognizing, when a second motion of a second body part matched with an object in an object group including the representative object is detected after the detection of the first motion, the object as a second input, wherein:

when the second motion of the second body part is not detected within a preset period of time after the first motion of the first body part is detected, recognizing the representative object matched with the first body part as an input;

when the second motion of the second body part is performed and detected within the preset period of time after the first motion of the first body part is detected, recognizing the object matched with the second body part as an input; and when the second motion of the second body part is detected a plurality of times after the detection of the first motion of the first body part, recognizing the object matched with a number of the times of the second motion of the second body part as an input, the object is included in the object group including the representative object and located in the object group sequentially in alphabetical order corresponding to the number of the times of the second motion, forward or backward.

2. The motion-based character input method of claim 1, further comprising:

when the first motion is detected, converting the representative object to a first hologram image and a first sound to output the first hologram image and the first sound, and when the second motion is detected, converting the object to a second hologram image and a second sound to output the second hologram image and the second sound.

3. The motion-based character input method of claim 1, wherein the first body part includes a first finger of one hand, and the second body part includes a second finger of the other hand.

4. The motion-based character input method of claim 3, wherein the first motion includes folding and unfolding of the first finger, and the second motion includes folding and unfolding of the second finger.

5. The motion-based character input method of claim 1, wherein the first body part and the second body part are a finger of one hand, the first motion includes folding and unfolding of the finger of the one hand, and the second motion includes folding and unfolding of the finger of the one hand detected after a direction of the one hand is changed.

6. The motion-based character input method of claim 1, wherein the first body part and the second body part include a finger of one hand, the first motion includes folding of the finger of the one hand, and the second motion includes unfolding of the finger of the one hand detected after writing motion of the finger of the one hand.

7. The motion-based character input method of claim 1, wherein the first body part includes a tongue, and the second body part includes an eye.

8. The motion-based character input method of claim 7, wherein the first motion includes sticking out of the tongue in at least one of a forward direction, an upward direction, a downward direction, a leftward direction, and a rightward direction, and the second motion includes opening and closing of both eyes detected after the first motion.

9. The motion-based character input method of claim 1, wherein the first body part includes a tongue, and the second body part includes an eye or the tongue.

10. The motion-based character input method of claim 9, wherein the first motion includes sticking out of the tongue in at least one of a forward direction, an upward direction, a downward direction, a leftward direction, and a rightward direction, and the second motion includes closing of one eye and sticking out of the tongue in at least one of a forward direction, an upward direction, a downward direction, a leftward direction, and a rightward direction which is detected after the first motion.

11. A non-transitory computer-readable storage medium including computer executable instructions, wherein the instructions, when executed by a processor, cause the processor to perform a motion-based character input method, the method comprising:

matching each of a plurality of representative objects with one of a plurality of bodies, wherein the plurality of representative objects are, respectively, included in object groups each of which includes one or more objects;

recognizing, when a first motion of a first body part matched with a representative object among the plurality of representative objects is detected, the representative object as a first input; and recognizing, when a second motion of a second body part matched with an object in an object group including the representative object is detected after the detection of the first motion, the object as a second input, wherein:

when the second motion of the second body part is not detected within a preset period of time after the first motion of the first body part is detected, recognizing the representative object matched with the first body part as an input;

when the second motion of the second body part is performed and detected within a preset period of time after the first motion of the first body part is detected, recognizing the object matched with the second body part as an input; and when the second motion of the second body part is detected a plurality of times after the detection of the first motion of the first body part, recognizing the object matched with a number of the times of the second motion of the second body part as an input, the object is included in the object group including the representative object and located in the object group sequentially in alphabetical order corresponding to the number of the times of the second motion, forward or backward.

12. A motion-based character input apparatus for matching each of a plurality of representative objects with bodies, wherein the plurality of representative objects are, respectively, included in object groups each of which includes one or more objects, comprising:

a first motion detection unit configured to detect a first motion of a first body part matched with a representative object among the plurality of representative objects;

a second motion detection unit configured to detect, after the detection of the first motion, a second motion of a second body part matched with an object in an object group including the representative object; and an object input recognition unit configured to recognize the representative object as a first input when the first motion is detected and recognize the object as a second input when the second motion is detected, wherein:

when the second motion of the second body part is not detected by the second motion detection unit within a preset period of time after the first motion of the first body part is detected by the first motion detection unit, the object input recognition unit is configured to recognize the representative object matched with the first body part as an input; and when the second motion of the second body part is performed and detected by the second motion detection unit within a preset period of time after the first motion of the first body part is detected by the first motion detection unit, the object input recognition unit is configured to recognize the object matched with the second body part as an input; and when the second motion of the second body part is detected a plurality of times after the detection of the first motion of the first body part, recognizing the object matched with a number of the times of the second motion of the second body part as an input, the object is included in the object group including the representative object and located in the object group sequentially in alphabetical order corresponding to the number of the times of the second motion, forward or backward.

13. The motion-based character input apparatus of claim 12, further comprising:

a virtual screen display unit configured to display a hologram image for inputting characters in a space; and an object display unit configured to display character corresponding to the representative object or the object that is recognized as an input in a predetermined area of the hologram image.

* * * * *